Oct. 6, 1959     M. MURER     2,907,397
FURROW COVER
Filed April 12, 1955     2 Sheets-Sheet 1
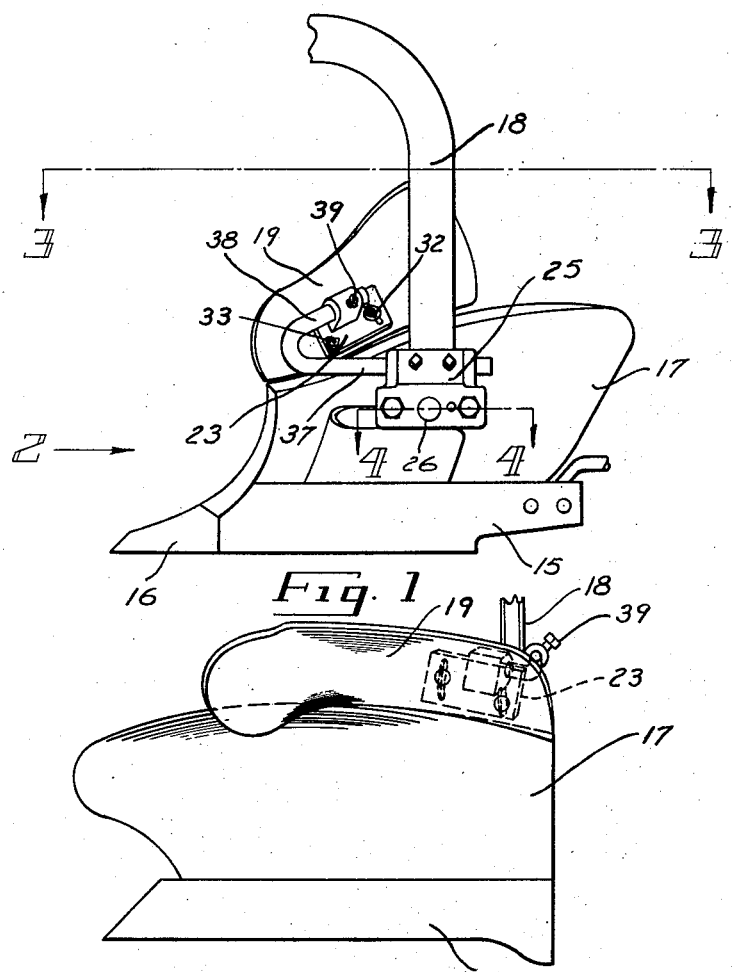
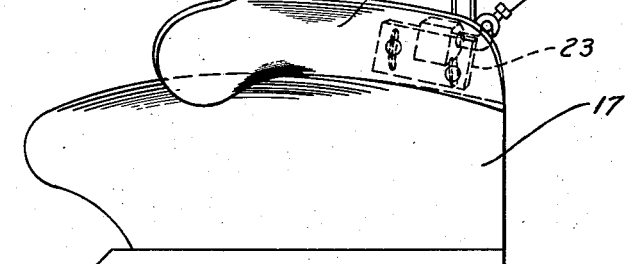
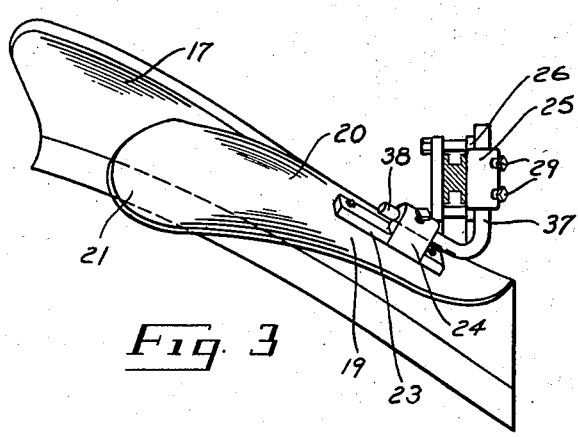
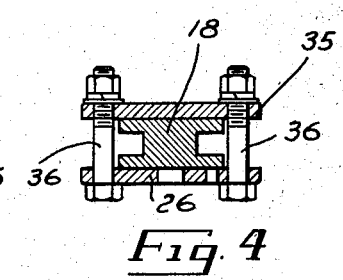
INVENTOR.
MURREL MURER Oct. 6, 1959 M. MURER 2,907,397
FURROW COVER
Filed April 12, 1955 2 Sheets-Sheet 2
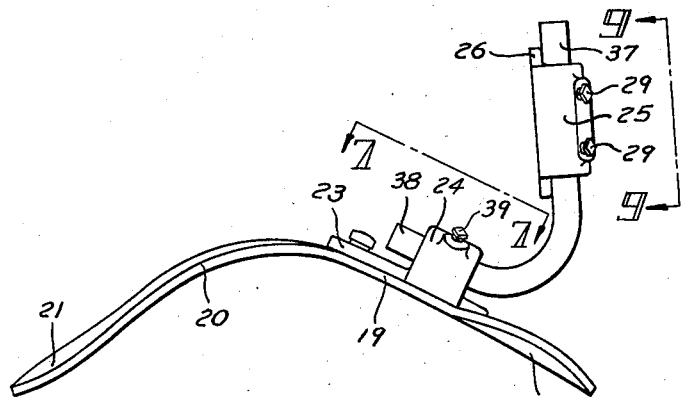
Fig. 5
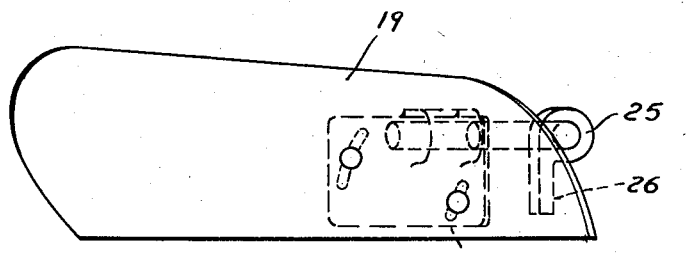
Fig. 6
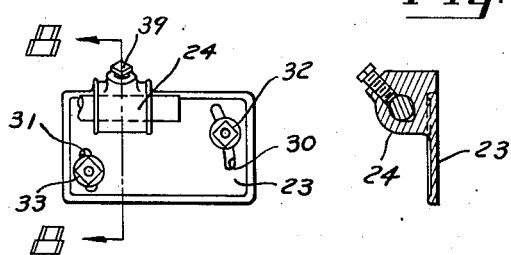
Fig. 7  Fig. 8
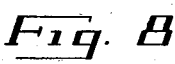
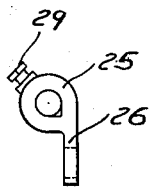
Fig. 9  Fig. 10
INVENTOR.
MURREL MURER
BY Thos. S. Donnelly
attorney

United States Patent Office 2,907,397
Patented Oct. 6, 1959

2,907,397

FURROW COVER

Murrel Murer, Detroit, Mich., assignor, by mesne assignments, to Dale Rue, Shelbyville, Mich.

Application April 12, 1955, Serial No. 500,856

1 Claim. (Cl. 172—736)

My invention relates to a new and useful improvement in a furrow cover for use on plows having a share.

A very troublesome problem in plowing is that weeds, brush, trash and cover crops have a tendency to clog around the beam of the plow above the share. Another difficulty encountered when plowing soil having high weeds and brush is that the turned over furrow does not cover these weeds or brush, but leaves a portion of the same projecting outwardly from the freshly turned earth at the edge of the furrow.

It is an object of the present invention to provide an attachment to a plow which may be easily and quickly mounted thereon and removed therefrom and which, when in use, will avoid the difficulties aforementioned.

Another object of the invention is the provision of an attachment to a plow which will engage the furrow which is being turned forwardly of the rear end of the share and turn this forward end of the furrow downwardly so that if high cover, such as weeds or brush, are on the land, the same will be turned downwardly into a position for being completely covered as the over-turned furrow rolls from the rear end of the plow share.

Another object of the invention is the provision of a furrow engaging member positioned to engage the freshly turned furrow forwardly of the rear end of the plow share and which may be mounted on the plow in such a manner as to be adjustable to various positions depending upon the plowing conditions encountered.

Another object of the invention is the provision of a furrow engaging member having means for attaching the same to the plow in such a manner that this engaging member may be adjusted to various positions while mounted on the plow and easily and quickly removed therefrom or replaced thereon.

Other objects will appear hereinafter.

It is recognized that various modifications and changes may be made in the detail of the structure illustrated without departing from the invention and it is intended that the present disclosure shall be considered to be but the preferred embodiment of the invention.

Forming a part of the application are drawings in which:

Fig. 1 is an elevational view of the plow showing the invention applied;

Fig. 2 is an elevational view of the invention taken from the opposite side of Fig. 1, showing the invention applied to a plow;

Fig. 3 is a top plan view of the invention showing it applied;

Fig. 4 is a sectional view taken on the line 4—4 of Fig. 1;

Fig. 5 is a top plan view of the invention;

Fig. 6 is an elevational view of the invention;

Fig. 7 is a view taken on line 7—7 of Fig. 5;

Fig. 8 is a sectional view taken on the line 8—8 of Fig. 7;

Fig. 9 is an elevational view taken on the line 9—9 of Fig. 5;

Fig. 10 is an elevational view taken on the line 10—10 of Fig. 9.

In the drawings I have illustrated a plow embodying a land side 15, a plow point 16, and a share 17, connected to which and projecting upwardly therefrom is the plow beam 18.

The invention comprises a furrow engaging plate 19 which is angularly turned outwardly from one face as at 20 and a terminal portion 21 which is again angularly turned to face downwardly when the invention is in use. The front end of the plate 19 is angularly turned slightly as at 22 so that the face at the forward end is inclined slightly upwardly. Mounted on this furrow engaging plate 19 is a plate 23 projecting outwardly from which is a boss 24 to form a knuckle. This plate 23 is provided with the arcuate slots 30 and 31 through which project the bolts 32 and 33 whereby the plate 23 may be secured to the furrow engaging plate 19 and adjusted to various positions thereon.

A plate 26 is provided with a plurality of openings 27 and a smaller opening 28. Bolts 36 are adapted to be projected through these openings 27 and a locating pin (not shown) may engage in the opening 28. Formed integrally with the plate 26 is a knuckle 25 which serves as a bearing. In mounting this bearing 25 in position on the plow, the plate 26 engages one face of the plow beam 18, as shown in Fig. 4, and engaging the opposite face of the plow beam is a plate 35 having openings formed therethrough for reception of the bolts 36. In this manner the plate 26 and the integral knuckle or bearing 25 are rigidly mounted on the plow beam.

A rod 37 is provided with the angularly turned end 38 and this rod 37 is adapted to rockably project through a passage formed in the knuckle 24. The angularly turned end 38 projects through the knuckle 24 and may be fixed against any rocking movement therein by means of the set-screw 39. A pair of set-screws 29 thread into the knuckle 25 to retain the rod 37 in fixed relation therein.

When the furrow engaging plate 19 is mounted on the plate 23 as described and the plate 26 is mounted on the plow beam 18 as described, these parts may be connected together by means of the rod 37 and the angularly turned end 38. It is obvious that by loosening the set-screw 39 the plate 19 may be readily rocked on the angularly turned end 38 to any desired angle. By loosening bolts 32 and 33 this plate may be adjusted at its opposite ends upwardly and downwardly relatively to the plate 23. Likewise, by loosening the set-screws 29 the rod 37 may be rocked in the knuckle 25 so that there is thus provided an adjustment of the furrow engaging plate 19 which may be said to be universal.

It is to be noted that this furrow engaging plate projects forwardly of the plow beam 18 and that it rocks at its lower edge substantially with the alignment of the plow share 17. The exception to this alignment, however, is with the rear end of the furrow engaging plate 19 which is the rear end 21 being turned outwardly from the face of the plow share 17 and faced downwardly.

In a plowing operation, as the furrow commences to rise and slide upwardly on the plow share 17, it will be engaged by the forward end 22 of the engaging plate 19 and the upper edge of this furrow being turned upwardly will be folded over downwardly through engagement with the face of the engaging plate 19 so that as the furrow reaches the face of the rear end of the share the forward end of the furrow will already have been turned under or downwardly. This makes it possible to completely cover brush, high weeds, or other cover which may be on the land being plowed. This assures a complete coverage of these parts by the over-turned furrow and also prevents accumulation of weeds, grass and so forth on the plow beam.

What I claim is:

A furrow cover adapted for use in conjunction with a plow share supported by a plow beam comprising: a first mounting plate adapted to be adjustably carried on said beam; a bearing knuckle integral with said mounting plate; a rod having one end adjustably rotatably mounted in said bearing knuckle on substantially the longitudinal center plane of the plow; said rod extending forwardly from said beam and having the other end thereof bent backwardly and outwardly from the longitudinal center plane of the plow; a second mounting plate carrying an integral knuckle bearing in which said other end of said rod is adjustably rotatably mounted; a contact plate; said second mounting plate being adjustably mounted on the non-engaging face of said contact plate; and said contact plate having its rear portion turned outwardly from the furrow engaging portion of the plow share and engageable at its forward portion with an initially turned up furrow as the furrow proceeds toward the rear of said contact plate, turning the furrow over prior to the engagement of the furrow with the rear end of the plow share.

References Cited in the file of this patent

UNITED STATES PATENTS

| | | |
|---|---|---|
| 362,023 | Lowden | Apr. 26, 1887 |
| 2,418,954 | Raleigh | Apr. 15, 1947 |
| 2,672,805 | Longenbach | Mar. 23, 1954 |
| 2,790,369 | Yetter | Apr. 30, 1957 |